(12) United States Patent
Chang et al.

(10) Patent No.: US 11,474,566 B2
(45) Date of Patent: Oct. 18, 2022

(54) ELECTRONIC DEVICE

(71) Applicant: PEGATRON CORPORATION, Taipei (TW)

(72) Inventors: Chun-Fu Chang, Taipei (TW); Hsiao-Fan Chen, Taipei (TW); I-Tien Hsieh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/166,096

(22) Filed: Feb. 3, 2021

(65) Prior Publication Data

US 2021/0278880 A1    Sep. 9, 2021

(30) Foreign Application Priority Data

Mar. 5, 2020  (TW) .................................. 109107334

(51) Int. Cl.
*G06F 1/16* (2006.01)

(52) U.S. Cl.
CPC .......... *G06F 1/1654* (2013.01); *G06F 1/1632* (2013.01)

(58) Field of Classification Search
CPC .... G06F 1/1654; G06F 1/1632; G06F 1/1616; Y10T 403/602; H05K 5/0221
USPC .................................................. 361/679.01
See application file for complete search history.

(56) References Cited

U.S. PATENT DOCUMENTS

| | | | | |
|---|---|---|---|---|
| 7,599,178 B2 * | 10/2009 | Huang | .................. | G06F 1/1626 361/679.28 |
| 9,047,049 B2 * | 6/2015 | Yang | ..................... | G06F 1/1626 |
| 10,185,360 B1 * | 1/2019 | Yang | ..................... | G06F 1/1632 |
| 2001/0024356 A1 | 9/2001 | Wenyuan et al. | | |
| 2003/0231465 A1 * | 12/2003 | Weng | .................... | G06F 1/1632 361/679.41 |
| 2013/0259564 A1 | 10/2013 | Lin et al. | | |

(Continued)

FOREIGN PATENT DOCUMENTS

| TW | I515530 B | 2/2014 |
|---|---|---|
| TW | M492602 U | 12/2014 |
| TW | 201727429 A | 8/2017 |

OTHER PUBLICATIONS

European Office Action dated Jul. 15, 2021 in corresponding European Application No. 21155807.7-1203.

*Primary Examiner* — Adrian S Wilson
*Assistant Examiner* — Gage Crum
(74) *Attorney, Agent, or Firm* — McClure, Qualey & Rodack, LLP

(57) ABSTRACT

Disclosed is an electronic device, including a first housing, a second housing, and a snap release module. The first housing is provided with a fastening slot. The second housing is provided with an accommodation slot. The snap release module is accommodated in the accommodation slot, and includes a slide member, an elastic component, a hook, and a stop member. The slide member reciprocates in a first axial direction. When the first housing is assembled to the second housing in the second axial direction, the slide member is located at the snap position for the hook to be buckled in the fastening slot, and the first housing presses the stop member so that the stop member abuts against the slide member. When the slide member slides from the snap position to the release position, the stop member stops the slide member and the hook is detached from the fastening slot.

14 Claims, 8 Drawing Sheets

(56) References Cited

U.S. PATENT DOCUMENTS

2014/0037372 A1* 2/2014 Chang .................. G06F 1/1681
  403/327
2017/0177030 A1  6/2017 Agata et al.
2017/0285693 A1* 10/2017 Mori ..................... G06F 1/1669

* cited by examiner

ELECTRONIC DEVICE

CROSS-REFERENCE TO RELATED APPLICATION

This application claims the priority benefit of Taiwan application no. 109107334, filed on Mar. 5, 2020. The entirety of the above-mentioned patent application is hereby incorporated by reference herein and made a part of this specification.

BACKGROUND

Technical Field

The application relates to an electronic device, and in particular, to an electronic device with a snap release module.

Related Art

For a conventional detachable notebook computer, to mount a display screen into an accommodation slot in a keyboard, the display screen is directly aligned with the accommodation slot and pressed down. A snap member in the accommodation slot naturally moves back and forth, and a hook of the snap member is correspondingly buckled in a fastening slot of the display screen, so that the assembly is completed.

However, to remove the display screen placed in the accommodation slot, the snap member needs to be pressed continuously with one hand, and a snap of the snap member needs to be moved out of the fastening slot of the display screen before the display screen can be removed with the other hand. It is impossible to remove the display screen with one single hand.

SUMMARY

In view of this, the application provides an electronic device in an embodiment. The electronic device includes a first housing, a second housing, and a snap release module. The first housing is provided with a fastening slot. The second housing is provided with an accommodation slot. The snap release module is accommodated in the accommodation slot.

The snap release module includes a slide member, an elastic component, a hook, and a stop member. The slide member reciprocates in a first axial direction to be located at a snap position or a release position. The elastic component abuts between the second housing and the slide member, to provide an elastic force in the first axial direction. The hook is disposed on the slide member, where an arrangement position of the hook corresponds to the position of the fastening slot of the first housing. The stop member is disposed on a movement path of the slide member, protrudes from the accommodation slot, and is reciprocable in a second axial direction perpendicular to the first axial direction. When the first housing is assembled to the second housing in the second axial direction, the slide member is located at the snap position for the hook to be buckled in the fastening slot, and the first housing presses the stop member so that the stop member abuts against the slide member. When the slide member slides from the snap position to the release position to cause the hook to detach from the fastening slot, the stop member stops the slide member at the release position, the slide member pushes the elastic component to the second housing to generate the elastic force. When the first housing is detached from the second housing along the second axial direction, the stop member moves away from the slide member along the second axial direction, and the slide member slides from the release position to the snap position by the elastic force.

In some embodiments, the slide member includes a positioning slot and a guide slot, the stop member includes a reciprocable positioning column; and when the first housing is assembled to the second housing and the slide member moves from the snap position to the release position, the guide slot moves relative to the positioning column until the positioning slot moves below the positioning column, so that the positioning column abuts against the positioning slot.

In some embodiments, the stop member further includes a body, a first elastic component, and a second elastic component, the body comprises an accommodating space, the first elastic component abuts between the body and the second housing, to provide a first elastic force to the body, the positioning column and the second elastic component are assembled in the accommodating space, and the second elastic component abuts between the body and the positioning column, to provide a second elastic force to the positioning column, so that the positioning column is able to protrude from or to be accommodated in the accommodating space of the body.

In some embodiments, the snap release module further includes a limiting member, the slide member includes a limiting part disposed in the first axial direction, and the limiting member passes through the limiting part, to restrict the slide member to move along the first axial direction.

In some embodiments, the snap release module further includes a first operating member, the first operating member is disposed on the slide member and is exposed from the surface of the second housing.

In some embodiments, the snap release module further includes a second operating member, the second operating member is assembled between the first operating member and the second housing, the second operating member moves between an operable position and an anti-mistouch position, and when the second operating member is located at the anti-mistouch position, the second operating member abuts against the second housing and stops the first operating member.

In some embodiments, the second operating member includes an operating part, the first operating member is provided with a through groove, and the operating part correspondingly passes through and slides in the through groove.

In some embodiments, the second operating member further includes a protruding part protruding toward the accommodation slot, the second housing is provided with a first opening groove and a second opening groove, the first opening groove extends along the first axial direction, the second opening groove extends along the second axial direction, the protruding part passes through and slides in the first opening groove or the second opening groove, when the second operating member is located at the operable position, the second operating member slides in the first opening groove, and when the second operating member is located at the anti-mistouch position, the second operating member slides to the second opening groove.

The application provides an electronic device in another embodiment. The electronic device includes a housing and a snap release module. The housing is provided with an accommodation slot. The snap release module is accommodated in the accommodation slot.

The snap release module includes a slide member, an elastic component, a hook, and a stop member. The slide member reciprocates in a first axial direction to be located at a snap position or a release position. The elastic component abuts between the housing and the slide member, to provide an elastic force when the slide member is located at the release position, so that the slide member resets to the snap position. The hook is disposed on the slide member. The stop member is disposed on a movement path of the slide member, protrudes from the accommodation slot, and is reciprocable in a second axial direction perpendicular to the first axial direction, to be suitable for stopping the slide member in the snap position or the release position.

In some embodiments, the stop member includes a positioning column, a body, a first elastic component, and a second elastic component. The body comprises an accommodating space. The first elastic component abuts between the body and the housing, to provide a first elastic force to the body. The positioning column and the second elastic component are assembled in the accommodating space. The second elastic component abuts between the body and the positioning column, to provide a second elastic force to the positioning column, so that the positioning column is able to protrude from or to be accommodated in the accommodating space of the body.

In some embodiments, the snap release module further includes a limiting member, the slide member includes a limiting part disposed in the first axial direction, and the limiting member passes through the limiting part, to restrict the slide member to move along the first axial direction.

In some embodiments, the snap release module further includes a first operating member, the first operating member is disposed on the slide member and is exposed from the surface of the housing.

In some embodiments, the snap release module further includes a second operating member. The second operating member is assembled between the first operating member and the housing. The second operating member moves between an operable position and an anti-mistouch position. When the second operating member is located at the anti-mistouch position, the second operating member abuts against the housing and stops the first operating member.

In some embodiments, the second operating member includes an operating part. The first operating member is provided with a through groove. The operating part correspondingly passes through and slides in the through groove.

In some embodiments, the second operating member further includes a protruding part protruding toward the accommodation slot. The housing is provided with a first opening groove and a second opening groove. The first opening groove extends along the first axial direction, and the second opening groove extends along the second axial direction. The protruding part passes through and slides in the first opening groove or the second opening groove. When the second operating member is located at the operable position, the second operating member slides in the first opening groove. When the second operating member is located at the anti-mistouch position, the second operating member slides to the second opening groove.

Based on the above, the electronic device provided in the application, with the arrangement of the foregoing snap release module, the first housing provided with the display screen can be removed or assembled with one single hand. In addition, it is not necessary to continuously press or operate any component during the removal of the first housing. Furthermore, after the first housing is removed, the snap release module automatically returns to an initial position to provide the assembly of the snap a next time. With a single-handed operation mode, the convenience of use can be increased.

Detailed features and advantages of the application are described in detail in the following implementations, and the content of the implementations is sufficient for a person skilled in the art to understand and implement the technical content of the application. A person skilled in the art can easily understand the objectives and advantages related to the application according to the contents disclosed in this specification, the claims and the drawings.

DETAILED DESCRIPTION

Figure 1:
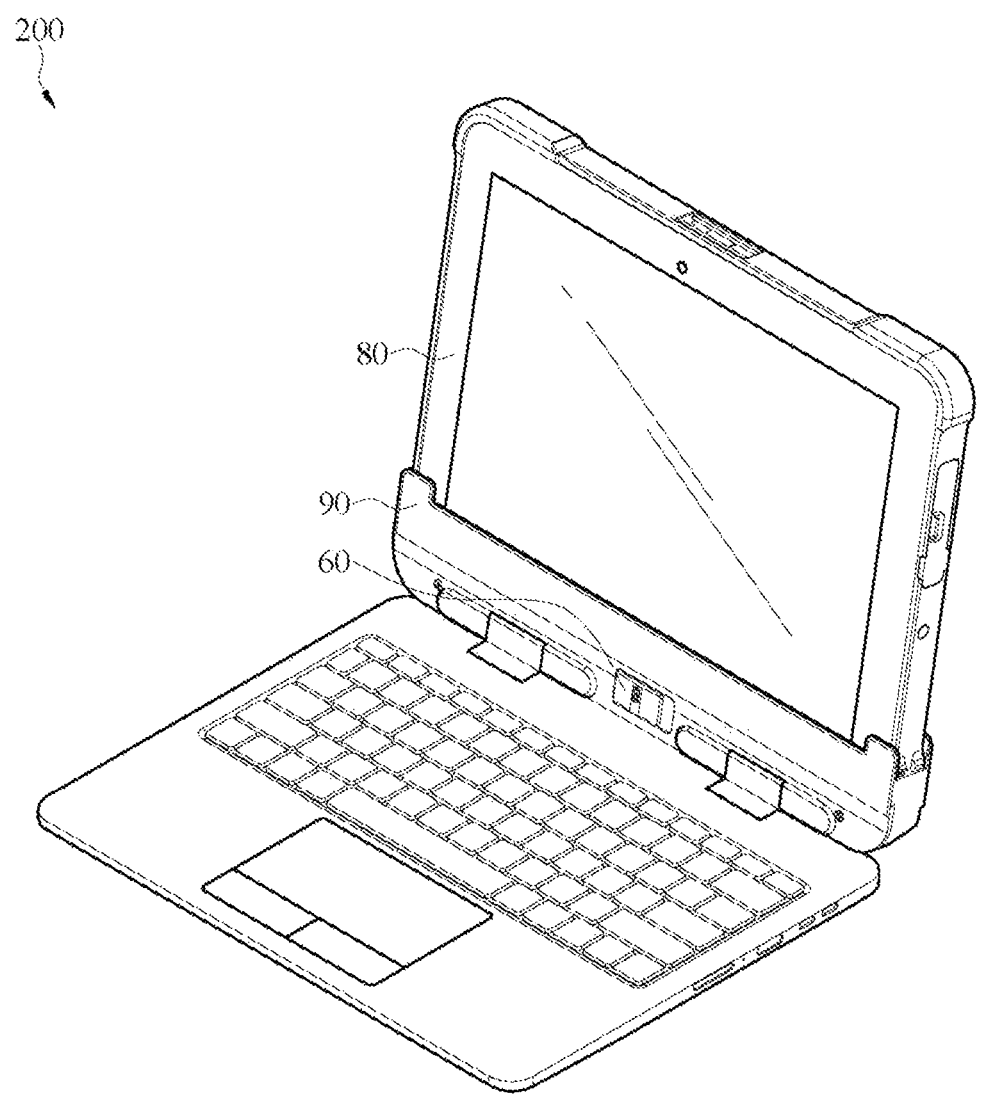
FIG. 1 is a schematic diagram of a first housing assembled to a second housing of an electronic device according to a first embodiment of the application.
Figure 2:
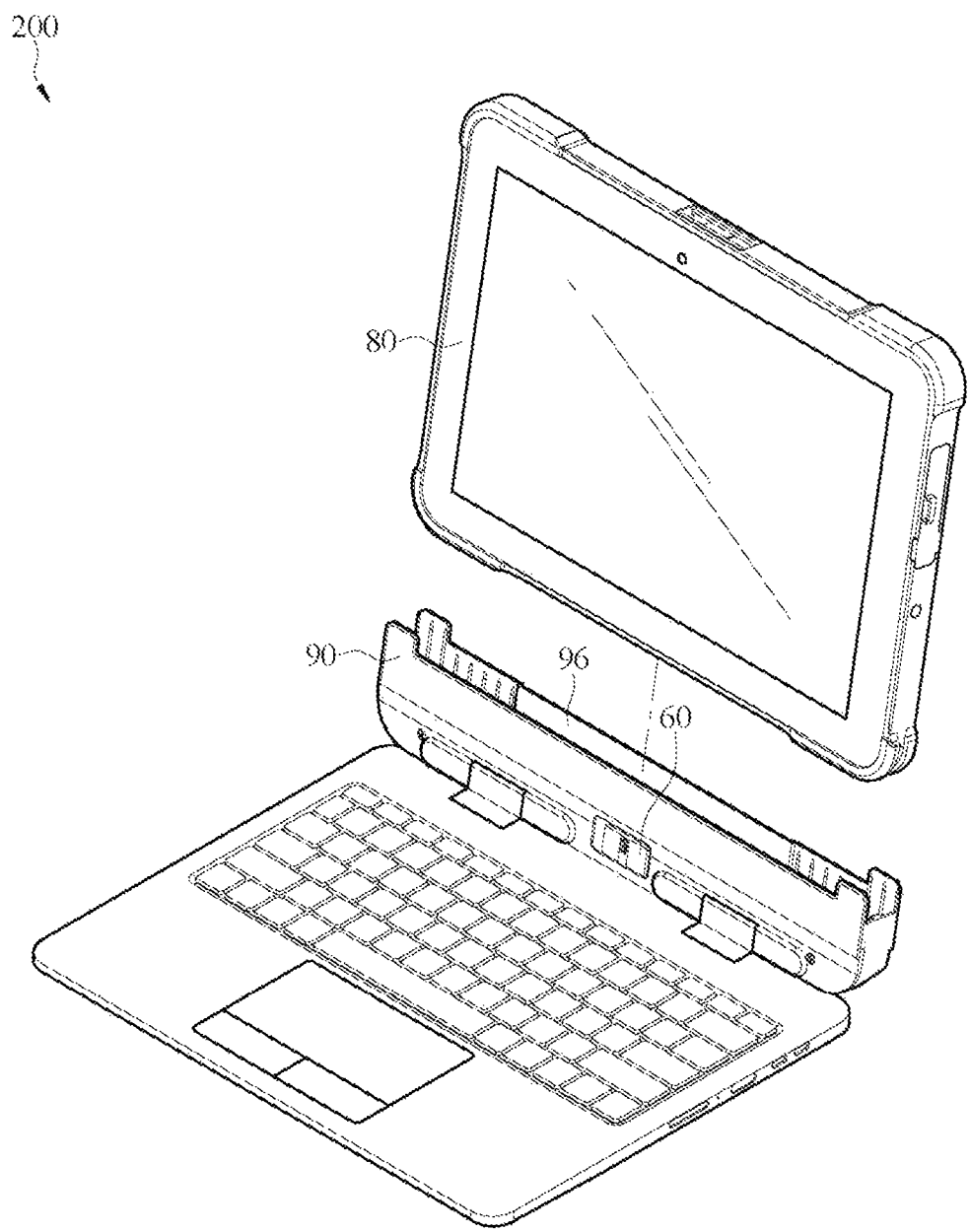
FIG. 2 is a schematic diagram of a first housing detached from a second housing of an electronic device according to the first embodiment of the application.
Figure 3:
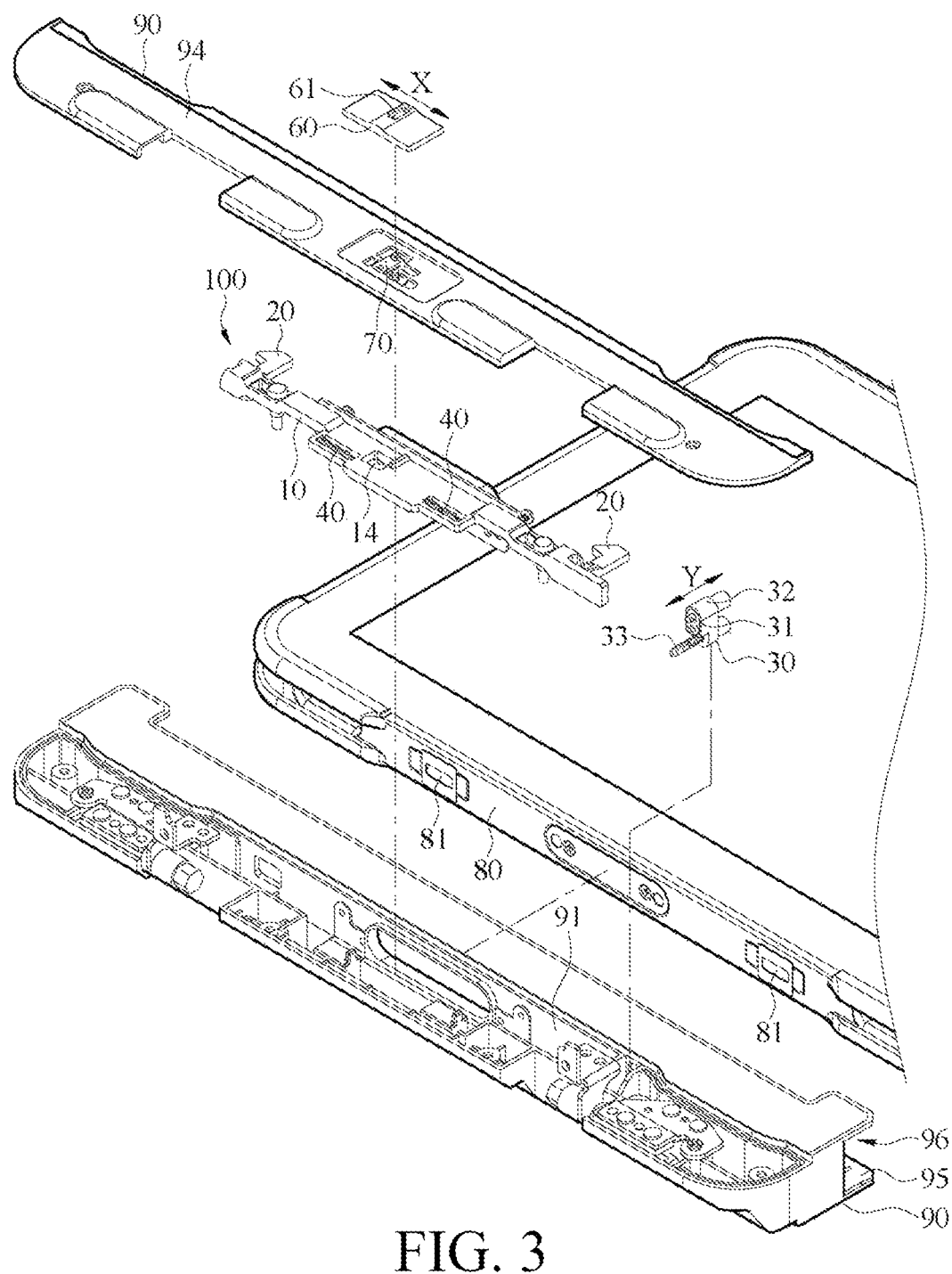
FIG. 3 is a partial schematic exploded view of an electronic device according to the first embodiment of the application.
Figure 4:
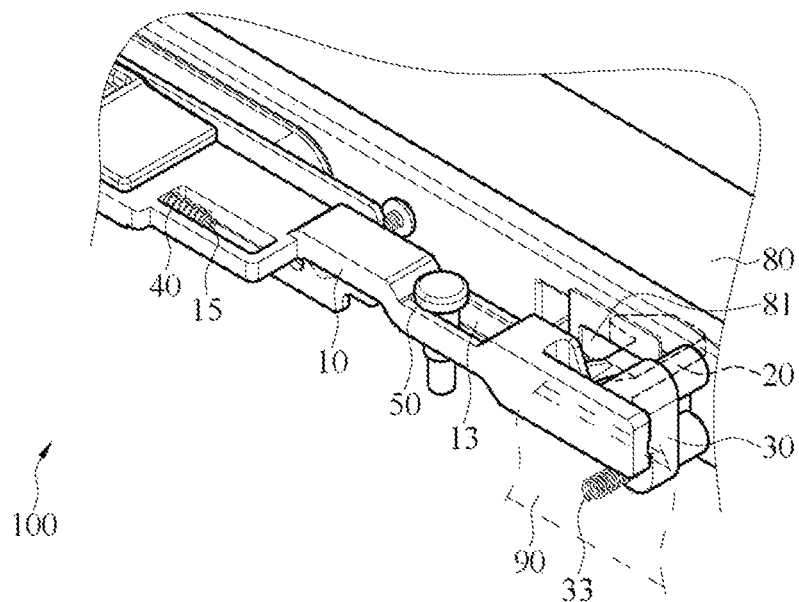
FIG. 4 is a partial schematic enlarged view of a slide member in a release position of an electronic device according to the first embodiment of the application.
Figure 5:
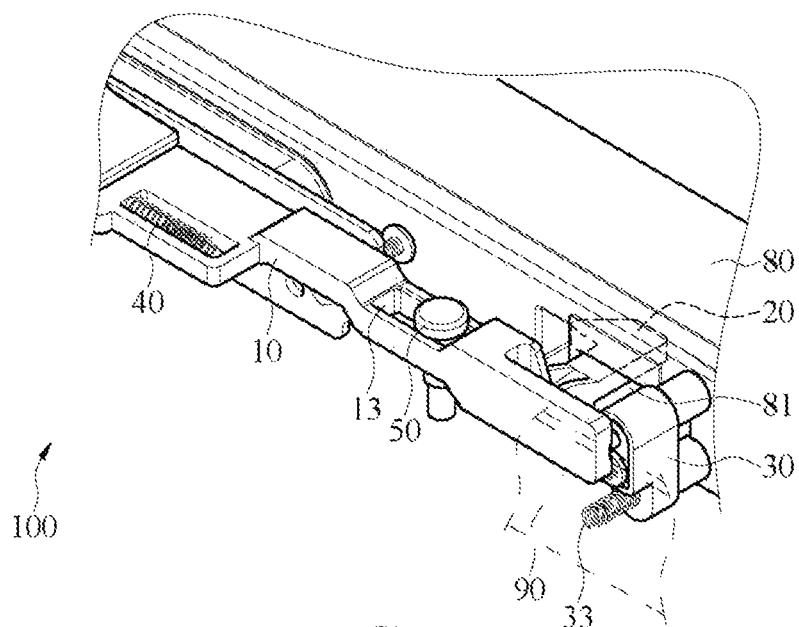
FIG. 5 is a partial schematic enlarged view of a slide member in a snap position of an electronic device according to the first embodiment of the application.
Figure 6:
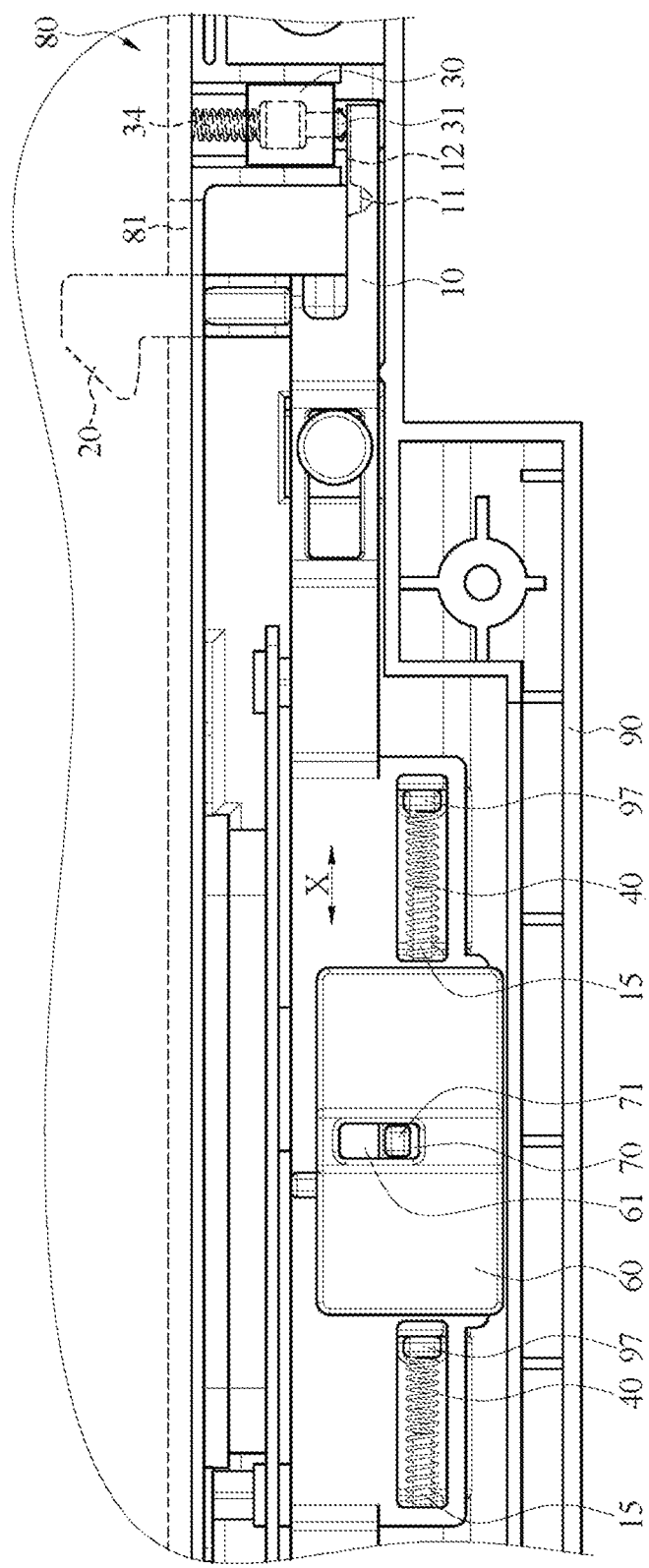
FIG. 6 is a partial schematic enlarged top view of a slide member in a snap position of an electronic device according to the first embodiment of the application.
Figure 7:
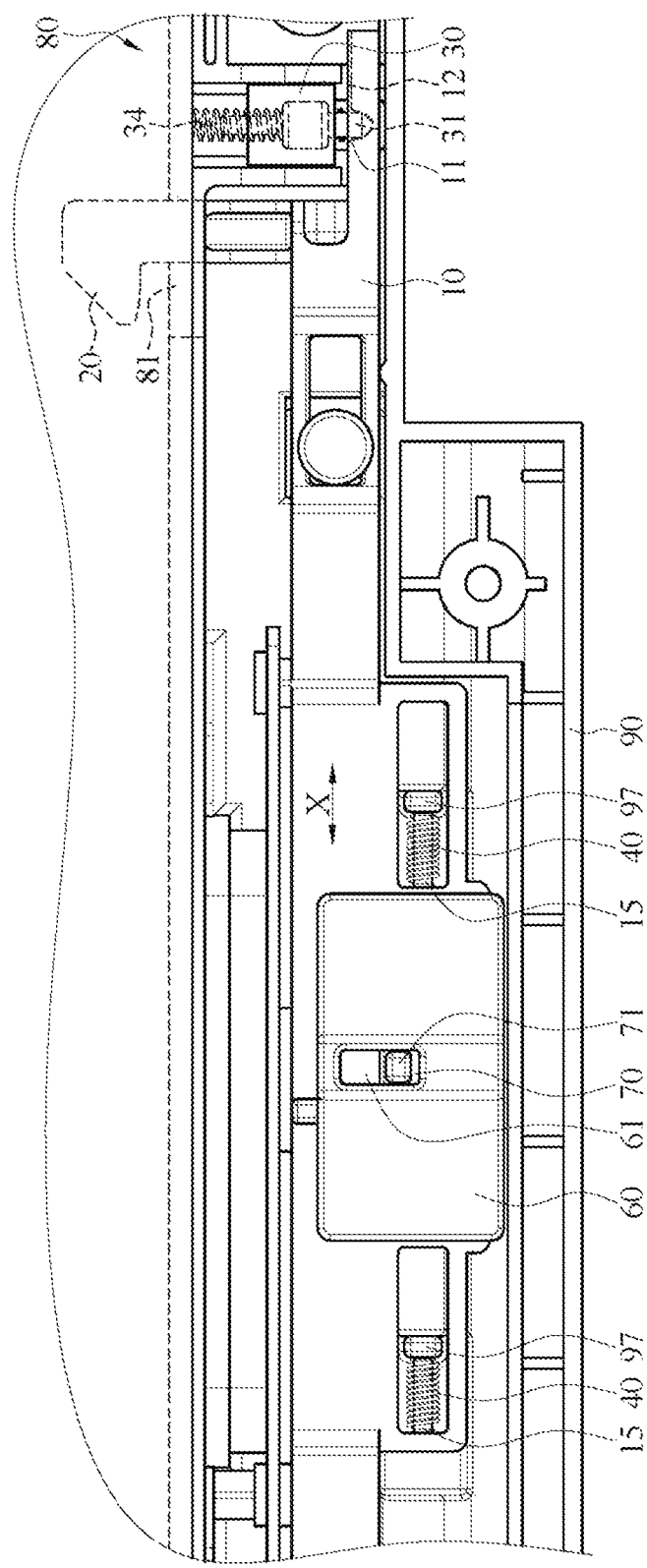
FIG. 7 is a partial schematic enlarged top view of a slide member in a release position of an electronic device according to the first embodiment of the application.

Referring to FIG. 1 to FIG. 7, FIG. 1 is a schematic diagram of a first housing assembled to a second housing of an electronic device according to a first embodiment of the application. FIG. 2 is a schematic diagram of a first housing detached from a second housing of an electronic device according to the first embodiment. FIG. 3 is a partial schematic exploded view of an electronic device according to the first embodiment of the application. FIG. 4 is a partial schematic enlarged view of a slide member in a release position of an electronic device according to the first embodiment of the application. FIG. 5 is a partial schematic enlarged view of a slide member in a snap position of an electronic device according to the first embodiment of the application. FIG. 6 is a partial schematic enlarged top view of a slide member in a snap position of an electronic device according to the first embodiment of the application. FIG. 7 is a partial schematic enlarged top view of a slide member in a release position of an electronic device according to the first embodiment of the application. As shown in FIG. 1 to FIG. 3, an electronic device 200 of this embodiment includes a first housing 80, a second housing 90, and a snap release module 100. It can be seen in FIG. 3 that the second housing 90 includes a cover plate 94 and a base 95. The base 95 is provided with an accommodation slot 91 and an assembly slot 96. The cover plate 94 covers a position, corresponding to the accommodation slot 91, on the base 95. In this embodiment, the first housing 80 and the second housing 90 that can cooperate to be buckled are used as an example for description. In another embodiment, the second housing 90 provided with the snap release module 100 may be alternatively used, to facilitate mutual assembly with various types of display screens or electronic devices.

As shown in FIG. 1 and FIG. 2, in this embodiment, the first housing 80 is provided with a display screen, and the second housing 90 is provided with a keyboard. However, the application is not limited thereto. In another embodiment, the first housing 80 and the second housing 90 may both be provided with a display screen or the first housing 80 may be a tablet computer. As shown in FIG. 3, the snap release module 100 of this embodiment includes a slide member 10, a hook 20, a stop member 30, and an elastic component 40. The first housing 80 is provided with a fastening slot 81. The snap release module 100 is accommodated in the accommodation slot 91 of the second housing 90.

As shown in FIG. 1 and FIG. 2, in this embodiment, the snap release module 100 further includes a first operating member 60. The first operating member 60 is exposed from the surface of the second housing 90, so that a user drives the slide member 10 by operating the first operating member 60. Specifically, it can be seen in FIG. 3 that the slide member 10 is provided with a through hole 14. The first operating member 60 is provided with a protruding part (not shown in FIG. 3) protruding from the bottom. The protruding part passes through the through hole 14 of the slide member 10. Therefore, the first operating member 60 is disposed in the through hole 14 of the slide member 10, to drive the slide member 10 to reciprocate in a first axial direction X to be located at a snap position or a release position. However, the application is not limited thereto. In another embodiment, the slide member 10 may be provided with a grip or an operating component protruding toward the cover plate 94 until the grip or the operating component protrudes from the cover plate 94 of the accommodation slot 91 of the second housing 90, so that the user drives the slide member 10 through the grip or the operating component to reciprocate in the first axial direction X to be located at the snap position or the release position.

As shown in FIG. 3, FIG. 6, and FIG. 7, in this embodiment, the elastic component 40 abuts between the second housing 90 and the slide member 10, to provide an elastic force in the first axial direction X, so that the slide member 10 is able to reciprocate in the first axial direction X. For example, one end of the elastic component 40 may pass through a cylinder 15 provided in the slide member 10, and the other end of the elastic component 40 abuts against a protruding block 97, protruding upward to the slide member 10, of the second housing 90. A detailed operation manner is described in detail below. The elastic component 40 is a spring. However, the application is not limited thereto. In another embodiment, the elastic component 40 may be a leaf spring, to provide an elastic force in the first axial direction X.

The hook 20 is disposed on the slide member 10. An arrangement position of the hook 20 corresponds to the position of the fastening slot 81 of the first housing 80. The stop member 30 is disposed on a movement path of the slide member 10, protrudes from the accommodation slot 91, and is reciprocable in a second axial direction Y perpendicular to the first axial direction X. In this embodiment, when the first housing 80 is assembled to the assembly slot 96 of the second housing 90 in the second axial direction Y, the slide member 10 is located at the snap position so that the hook 20 is buckled in the fastening slot 81, and the first housing 80 presses the stop member 30 so that the stop member 30 abuts against the slide member 10. Specifically, in this embodiment, to insert the first housing 80 into the assembly slot 96 of the second housing 90 from a state shown in FIG. 2, the first housing 80 is directly aligned with the assembly slot 96 and pressed down. The snap release module 100 in the accommodation slot 91 provides the hook 20 with a thrust in the first axial direction X in cooperation with a circumferential edge of the fastening slot 81, and the elastic component 40 provides the hook 20 with an elastic force in the first axial direction X, so that the hook 20 of the snap release module 100 is correspondingly buckled in the fastening slot 81 of the first housing 80, and the first housing 80 is assembled to the second housing 90 (as shown in FIG. 1).

Referring to FIG. 4 and FIG. 5, in this embodiment, a front end of the hook 20 is provided with a slope. In a process of assembling the first housing 80 to the second housing 90, a notch of the fastening slot 81 of the first housing 80 is correspondingly pressed against the slope of the hook 20. In this case, the slide member 10 is driven under a relative effect of the hook 20 and the notch to move to the right side along the first axial direction X, so that the hook 20 enters the fastening slot 81. In this case, the elastic component 40 generates an elastic force from mutual abutting between the slide member 10 and the protruding block 97 (as shown in FIG. 7) of the second housing 90. When the front end of the hook 20 completely passes through the notch of the fastening slot 81 as shown in FIG. 4, the slide member 10 slides back to an initial position (as shown in FIG. 5) along the first axial direction X under the elastic force of the elastic component 40. In this case, because the first housing 80 cannot be detached from the second housing 90 due to the buckling of the snap release module 100, the position of the slide member 10 shown in FIG. 5 is the snap position.

In this embodiment, the snap release module 100 may further include a limiting member 50. The slide member 10 includes a limiting part 13 disposed in the first axial direction X. The limiting member 50 passes through the limiting part 13, to restrict the slide member 10 to move along the first axial direction X. As shown in FIG. 4, when the slide member 10 is moved to the rightmost side under the relative effect of the hook 20 and the notch, the limiting member 50 abuts against one end of the limiting part 13. When the slide member 10 returns to the snap position shown in FIG. 5 after the hook 20 passes through the notch of the fastening slot 81, the limiting member 50 abuts against the other end of the limiting part 13. With the arrangement of the limiting member 50, the slide member 10 reciprocates within a limited distance in the first axial direction X.

In addition, when the first housing 80 is not assembled to the second housing 90, the stop member 30 is in a state away from the slide member 10 when the stop member 30 is not pressed by the first housing 80. When the first housing 80 is assembled to the second housing 90, the stop member 30 moves to abut against the slide member 10 along the second axial direction Y under the pressing of the first housing 80. It can be seen in FIG. 5 and FIG. 6 that a positioning column 31 of the stop member 30 abuts against the slide member 10.

The operation mode and the structural operation of detaching the first housing 80 from the second housing 90 are described below. Referring to FIG. 3, FIG. 6, and FIG. 7 together, to detach the first housing 80 from the second housing 90 when the first housing 80 is assembled to the second housing 90, the slide member 10 is moved from the snap position (as shown in FIG. 6) to the release position (as shown in FIG. 7) to cause the hook 20 to detach from the fastening slot 81. The release position herein indicates that when the slide member 10 is located at this position, the snap release module 100 releases the buckling of the first housing 80, so that the first housing 80 can be moved and detached from the second housing 90.

As shown in FIG. 6, when the first housing 80 is assembled to the second housing 90, the slide member 10 is located at the snap position, and the stop member 30 abuts against the slide member 10, to detach the first housing 80 from the second housing 90, the user may operate the first operating member 60 to drive the slide member 10 to move toward the right in FIG. 6 along the first axial direction X to a position shown in FIG. 7. In this case, the stop member 30 stops the slide member 10 at the release position.

Figure 8:
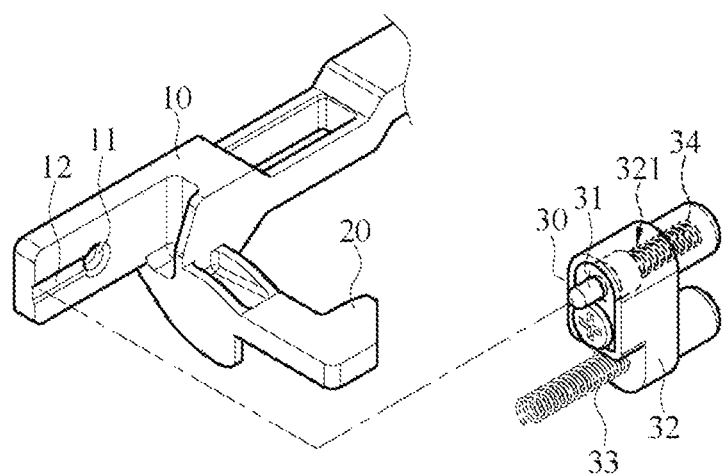
FIG. 8 is a schematic exploded view of a part of a slide member and a stop member of an electronic device according to the first embodiment of the application.

Referring to FIG. 3, and FIG. 6, to FIG. 8 together, FIG. 8 is a schematic exploded view of a part of a slide member and a stop member of an electronic device according to the first embodiment of the application. An embodiment of the stop member 30 stopping the slide member 10 is further provided below. Specifically, the slide member 10 includes a positioning slot 11 and a guide slot 12. It can be seen in FIG. 7 and FIG. 8 that the guide slot 12 is disposed extending in the first axial direction X. The positioning slot 11 and the guide slot 12 are located at an end of the slide member 10, and the positioning slot 11 is located at an end of the guide slot 12.

The stop member 30 includes a positioning column 31, a body 32, a first elastic component 33, and a second elastic component 34. The body 32 comprises an accommodating space 321. It can be seen in FIG. 3 to FIG. 5 that when the first elastic component 33 is assembled in the accommodation slot 91 of the second housing 90, the first elastic component 33 abuts between the body 32 and the second housing 90, to provide a first elastic force to the body 32, so that the body 32 is able to reciprocate in the second axial direction Y. It can be seen in FIG. 8 that the positioning column 31 and the second elastic component 34 are assembled in the accommodating space 321. The second elastic component 34 abuts between the body 32 and the positioning column 31, to provide a second elastic force to the positioning column 31, so that the positioning column 31 is able to protrude from or to be accommodated in the accommodating space 321 of the body 32.

When the first housing 80 is assembled in the assembly slot 96, as described above, the first housing 80 presses the stop member 30 to move along the second axial direction Y. In this case, because the first housing 80 presses the body 32 of the stop member 30, the body 32 is pushed to press the first elastic component 33, so that the first elastic component 33 is pushed to be compressed toward the second housing 90 to generate the first elastic force. In addition, as shown in FIG. 6, after the stop member 30 moves along the second axial direction Y, the positioning column 31 is driven to press the slide member 10. In this case, under abutting of the slide member 10, a part of the positioning column 31 is pressed into the accommodating space 321 to compress the second elastic component 34, for the second elastic component 34 to generate the second elastic force. When the stop member 30 is pressed to the positioning column 31 and abuts against the slide member 10, the positioning column 31 correspondingly abuts against the guide slot 12.

Then, when the slide member 10 moves from the snap position to the release position, as shown in FIG. 7, the guide slot 12 moves relative to the positioning column 31 until the positioning slot 11 moves below the positioning column 31. The positioning column 31 is limited by the guide slot 12. When the positioning slot 11 comes below the positioning column 31, the positioning column 31 moves, under the second elastic force provided by the second elastic component 34, to protrude out of the accommodating space 321 of the body 32 to abut against the positioning slot 11. Therefore, the slide member 10 is buckled and fixed in the release position as a result of mutual buckling of the positioning column 31 and the positioning slot 11. In this case, as shown in FIG. 7, the hook 20 moves to the right along with the slide member 10, so that the hook 20 detaches from the fastening slot 81, and the first housing 80 can be detached from the second housing 90 along the second axial direction Y. In addition, it can be seen in FIG. 7 that the slide member 10 simultaneously pushes the elastic component 40 to the protruding block 97 of the second housing 90 to generate the elastic force.

Finally, when the first housing 80 is detached from the second housing 90 along the second axial direction Y, the stop member 30 moves away from the slide member 10 along the second axial direction Y, and the slide member 10 moves from the release position to the snap position by the elastic force. Referring to FIG. 3, FIG. 4, FIG. 7, and FIG. 8 together, after the first housing 80 is detached from the second housing 90, the first housing 80 no longer presses the stop member 30. The stop member 30 is pushed away from the slide member 10 upward along the second axial direction Y under the first elastic force of the first elastic component 33. In this case, because the stop member 30 moves away from the slide member 10 along the second axial direction Y, the positioning column 31 protrudes out of the accommodating space 321 by the second elastic force and moves away from the positioning slot 11 along the second axial direction Y along with the stop member 30, and the stop member 30 releases buckling and fixing of the slide member 10.

When the slide member 10 is released, the elastic component 40 in FIG. 7 is compressed by the slide member 10 and the protruding block 97 to generate an elastic force. The elastic force causes the slide member 10 to move from the release position to an initial snap position (for example, a position as shown in FIG. 6) along the first axial direction X. Therefore, after removing the first housing 80, the user does not need to operate the slide member 10 additionally to enable the slide member 10 to return to the initial snap position, so that the operation is more intuitive and convenient.

Figure 9:
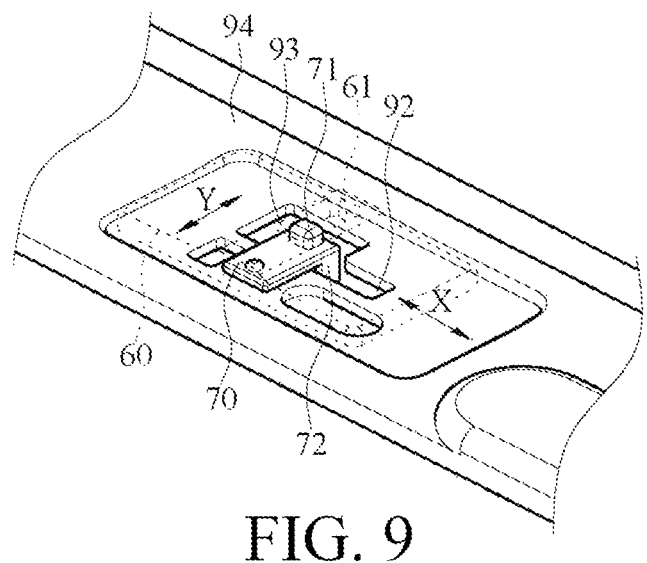
FIG. 9 is a partial schematic enlarged view of a second operating member in an operable position of an electronic device according to the first embodiment of the application.
Figure 10:
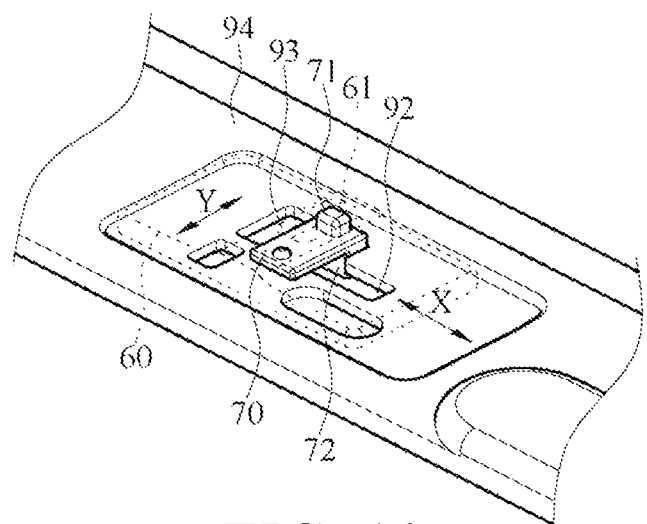
FIG. 10 is a partial schematic enlarged view of a second operating member in an anti-mistouch position of an electronic device according to the first embodiment of the application.

Referring to FIG. 9 and FIG. 10, FIG. 9 is a partial schematic enlarged view of a second operating member in an operable position of an electronic device according to the first embodiment of the application. FIG. 10 is a partial schematic enlarged view of a second operating member in an anti-mistouch position of an electronic device according to the first embodiment of the application. For clear description, only the cover plate 94 of the second housing 90 and a second operating member 70 are shown in FIG. 9, and other components are omitted. In this embodiment, the snap release module 100 may further include the second operating member 70. The second operating member 70 moves between an operable position (as shown in FIG. 9) and an anti-mistouch position (as shown in FIG. 10). It can be seen in FIG. 9 that the second operating member 70 includes an operating part 71. It can be seen in FIG. 6 that the first operating member 60 is provided with a through groove 61. The operating part 71 correspondingly passes through and slides in the through groove 61. It can be seen by combining FIG. 3, FIG. 6, and FIG. 8 that the second operating member 70 and the first operating member 60 are connected to each other by the operating part 71 and the through groove 61, so that the second operating member 70 can move left and right along the first axial direction X in the operable position under the driving of the first operating member 60. In other words, the operable position indicates that when located at this position, the second operating member 70 may reciprocate in the first axial direction X under the driving of the first operating member 60, and drive the slide member 10 to move between the snap position and the release position at the same time.

When the user wants to avoid accidentally touching the first operating member 60 and causing the slide member 10 to move to the release position, the user may operate the operating part 71 of the second operating member 70 to move the second operating member 70 upward along the through groove 61, so that the second operating member 70 moves to the anti-mistouch position (as shown in FIG. 10). Herein, the anti-mistouch position herein indicates that when the second operating member 70 is located at the anti-mistouch position, the second operating member 70 abuts against the second housing 90 and stops the first operating member 60. Because the second operating member 70 cannot move along the first axial direction X under the abutment of the second housing 90, the first operating member 60 is also stopped and cannot move along the first axial direction X, and the first operating member 60 cannot drive the slide member 10 to move to the release position.

Specifically, as shown in FIG. 9 and FIG. 10, in this embodiment, the second operating member 70 includes a protruding part 72 protruding toward the accommodation slot 91. The cover plate 94 of the second housing 90 is provided with a first opening groove 92 and a second opening groove 93. The first opening groove 92 extends along the first axial direction X, and the second opening groove 93 extends along the second axial direction Y. The protruding part 72 passes through and slides in the first opening groove 92 or the second opening groove 93. As shown in FIG. 9, when the second operating member 70 is located at the operable position, the protruding part 72 of the second operating member 70 slides in the first opening groove 92.

As shown in FIG. 10, when the operating part 71 of the second operating member 70 slides upward along the second axial direction Y to the second opening groove 93 along the through groove 61 of the first operating member 60, the second operating member 70 moves to be located at the anti-mistouch position. With the arrangement of the first opening groove 92 and the second opening groove 93, when located at the anti-mistouch position, the operating part 71 slides to the second opening groove 93 along the second axial direction Y. In this case, because the protruding part 72 is stopped by the second housing 90, the second operating member 70 can no longer move to the right along the first axial direction X. Therefore, the first operating member 60 can no longer move to the right along the first axial direction X either, and further cannot drive the slide member 10 to move. In this way, even though the user accidentally operates the first operating member 60 to move to the right, the slide member 10 cannot move to the release position, to prevent the first housing 80 from being detached from the second housing 90 by misoperation.

Based on the above, for the electronic device 200 provided in the application, with the arrangement of the foregoing snap release module 100, when the user wants to assemble the first housing 80 to the second housing 90, the user can press the first housing 80 to the second housing 90 with one single hand to complete assembly. In this case, the snap release module 100 is located at the snap position to prevent the first housing 80 from being detached from the second housing 90 during use. When the user wants to detach the first housing 80 from the second housing 90, the user operates the first operating member 60 with one single hand to move the slide member 10 from the snap position to the release position. In this case, the stop member 30 stops the slide member 10 at the release position, so that even though the first housing 80 is located at the accommodation slot 91 of the second housing 90, the first housing 80 is still in a state of being detachable along the second axial direction Y. In this case, the first housing 80 provided with the display screen can be removed with one single hand, and it is not necessary to continuously press or operate any component during the removal of the first housing 80. Furthermore, after the first housing 80 is removed, the snap release module 100 automatically returns to an initial position to provide a next snap assembly. With a single-handed operation mode, the convenience of use can be increased.

Although the application is disclosed above with the foregoing embodiments, the embodiments are not intended to limit the application. Anyone familiar with related arts may make some changes and improvements without departing from the spirit and scope of the application. Therefore, the patent protection scope of the application shall be subject to the claims attached to this specification.

What is claimed is:

1. An electronic device, comprising:
  a first housing, provided with a fastening slot;
  a second housing, provided with an accommodation slot; and
  a snap release module, accommodated in the accommodation slot, the snap release module comprising:
    a slide member, reciprocating in a first axial direction to be located at a snap position or a release position, the slide member comprising a positioning slot and a guide slot;
    an elastic component, abutting between the second housing and the slide member, to provide an elastic force in the first axial direction;
    a hook, disposed on the slide member, wherein an arrangement position of the hook corresponds to the position of the fastening slot of the first housing; and
    a stop member, disposed on a movement path of the slide member, protruding from the accommodation slot, and reciprocable in a second axial direction perpendicular to the first axial direction, the stop member comprising a reciprocable positioning column, wherein when the first housing is assembled to the second housing along the second axial direction, the slide member is located at the snap position for the hook to be buckled in the fastening slot, and the first housing presses the stop member so that the stop member abuts against the slide member; when the slide member slides from the snap position to the release position to cause the hook to detach from the fastening slot, the stop member stops the slide member at the release position, the slide member pushes the elastic component to the second housing to generate the elastic force, the guide slot moves relative to the positioning column until the positioning slot moves below the positioning column, so that the stop member is pressed by the first housing and the positioning column abuts against the positioning slot, so as to stop the slide member at the release position; and when the first housing is detached from the second housing along the second axial direction, the stop member moves away from the slide member along the second axial direction, and the slide member slides from the release position to the snap position by the elastic force.

2. The electronic device according to claim 1, wherein the stop member comprises a body, a first elastic component, and a second elastic component, the body comprises an accommodating space, the first elastic component abuts between the body and the second housing, to provide a first elastic force to the body, the positioning column and the second elastic component are assembled in the accommodating space, and the second elastic component abuts between the body and the positioning column, to provide a second elastic force to the positioning column, so that the positioning column is able to protrude from or to be accommodated in the accommodating space of the body.

3. The electronic device according to claim 1, wherein the snap release module further comprises a limiting member, the slide member comprises a limiting part disposed in the first axial direction, and the limiting member passes through the limiting part, to restrict the slide member to move along the first axial direction.

4. The electronic device according to claim 1, wherein the snap release module further comprises a first operating member, the first operating member is disposed on the slide member and is exposed from the surface of the second housing.

5. The electronic device according to claim 4, wherein the snap release module further comprises a second operating member, the second operating member is assembled between the first operating member and the second housing, the second operating member moves between an operable position and an anti-mistouch position, and when the second operating member is located at the anti-mistouch position, the second operating member abuts against the second housing and stops the first operating member.

6. The electronic device according to claim 5, wherein the second operating member comprises an operating part, the first operating member is provided with a through groove, and the operating part correspondingly passes through and slides in the through groove.

7. The electronic device according to claim 5, wherein the second operating member further comprises a protruding part protruding toward the accommodation slot, the second housing is provided with a first opening groove and a second opening groove, the first opening groove extends along the first axial direction, the second opening groove extends along the second axial direction, the protruding part passes through and slides in the first opening groove or the second opening groove, when the second operating member is located at the operable position, the second operating member slides in the first opening groove, and when the second operating member is located at the anti-mistouch position, the second operating member slides to the second opening groove.

8. An electronic device, comprising:
a housing, comprising an accommodation slot; and
a snap release module, accommodated in the accommodation slot, the snap release module comprising:

a slide member, reciprocating in a first axial direction to be located at a snap position or a release position, the slide member comprising a positioning slot and a guide slot;
an elastic component, abutting between the housing and the slide member, to provide an elastic force when the slide member is located at the release position, so that the slide member is reset to the snap position;
a hook, disposed on the slide member; and
a stop member, disposed on a movement path of the slide member, protruding from the accommodation slot, and reciprocable in a second axial direction perpendicular to the first axial direction, to be suitable for stopping the slide member in the snap position or the release position, the stop member comprising a reciprocable positioning column, wherein when the slide member is move to the release position from the snap position, the guide slot moves relative to the positioning column until the positioning slot moves below the positioning column, so that the stop member is adaptable to be pressed to abut against the slide member so as to stop the slide member at the release position.

9. The electronic device according to claim 8, wherein the stop member comprises a positioning column, a body, a first elastic component, and a second elastic component, the body comprises an accommodating space, the first elastic component abuts between the body and the housing, to provide a first elastic force to the body, the positioning column and the second elastic component are assembled in the accommodating space, and the second elastic component abuts between the body and the positioning column, to provide a second elastic force to the positioning column, so that the positioning column is able to protrude from or to be accommodated in the accommodating space of the body.

10. The electronic device according to claim 8, wherein the snap release module further comprises a limiting member, the slide member comprises a limiting part disposed in the first axial direction, and the limiting member passes through the limiting part, to restrict the slide member to move along the first axial direction.

11. The electronic device according to claim 8, wherein the snap release module further comprises a first operating member, the first operating member is disposed on the slide member and is exposed from the surface of the housing.

12. The electronic device according to claim 11, wherein the snap release module further comprises a second operating member, the second operating member is assembled between the first operating member and the housing, the second operating member moves between an operable position and an anti-mistouch position, and when the second operating member is located at the anti-mistouch position, the second operating member abuts against the housing and stops the first operating member.

13. The electronic device according to claim 12, wherein the second operating member comprises an operating part, the first operating member is provided with a through groove, and the operating part correspondingly passes through and slides in the through groove.

14. The electronic device according to claim 12, wherein the second operating member further comprises a protruding part protruding toward the accommodation slot, the housing is provided with a first opening groove and a second opening groove, the first opening groove extends along the first axial direction, the second opening groove extends along the second axial direction, the protruding part passes through and slides in the first opening groove or the second opening groove, when the second operating member is located at the operable position, the second operating member slides in the first opening groove, and when the second operating member is located at the anti-mistouch position, the second operating member slides to the second opening groove.

* * * * *